March 14, 1944.　　　L. R. TEEPLE　　　2,344,183
BURNER CONTROL FOR TENDING FIRE
Filed Feb. 8, 1941　　　4 Sheets-Sheet 1
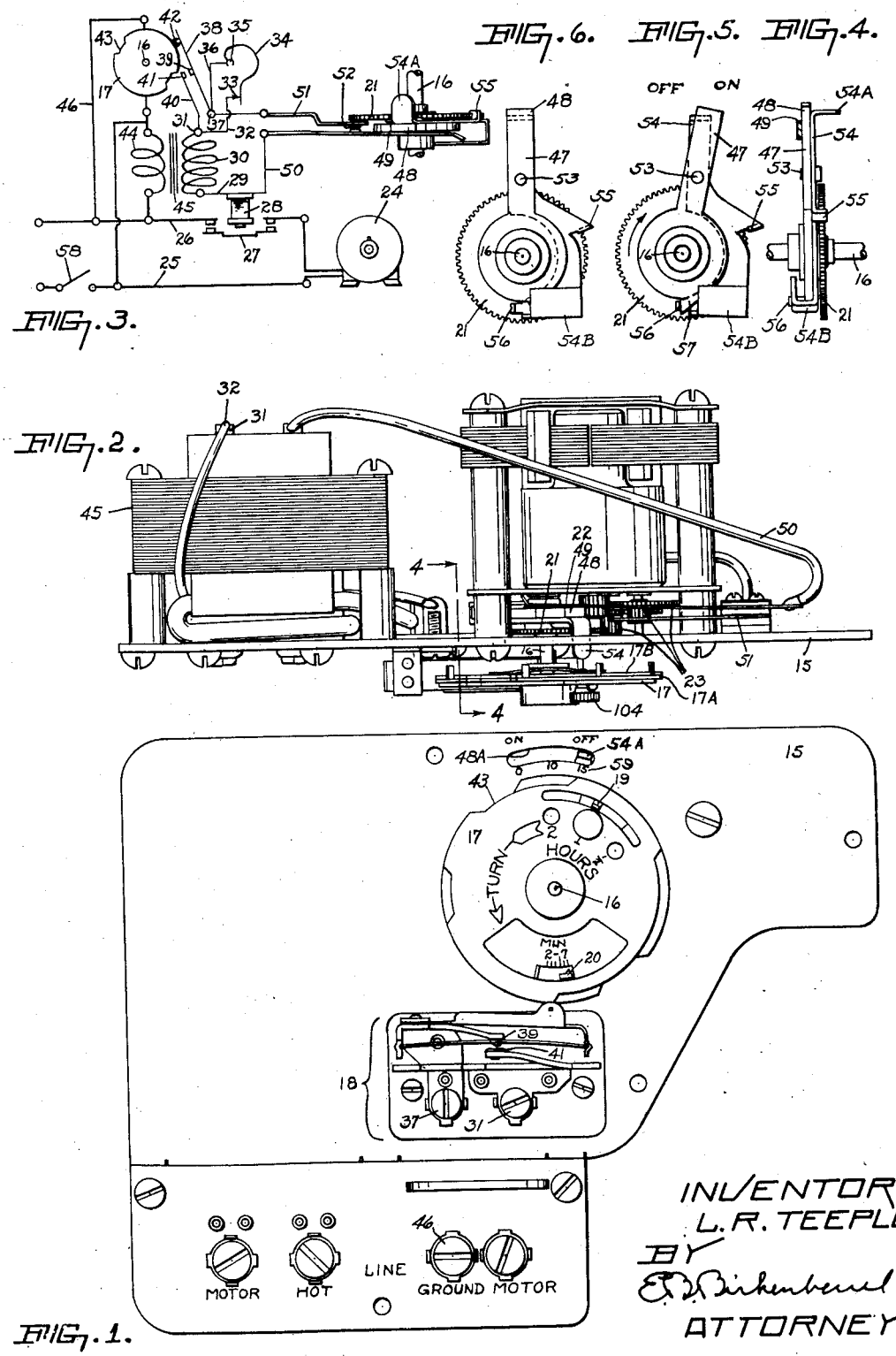

March 14, 1944.   L. R. TEEPLE   2,344,183
BURNER CONTROL FOR TENDING FIRE
Filed Feb. 8, 1941   4 Sheets-Sheet 2

INVENTOR
L. R. TEEPLE.
BY
C. B. Birkenbeuel
ATTORNEY

March 14, 1944.    L. R. TEEPLE    2,344,183
BURNER CONTROL FOR TENDING FIRE
Filed Feb. 8, 1941    4 Sheets-Sheet 3
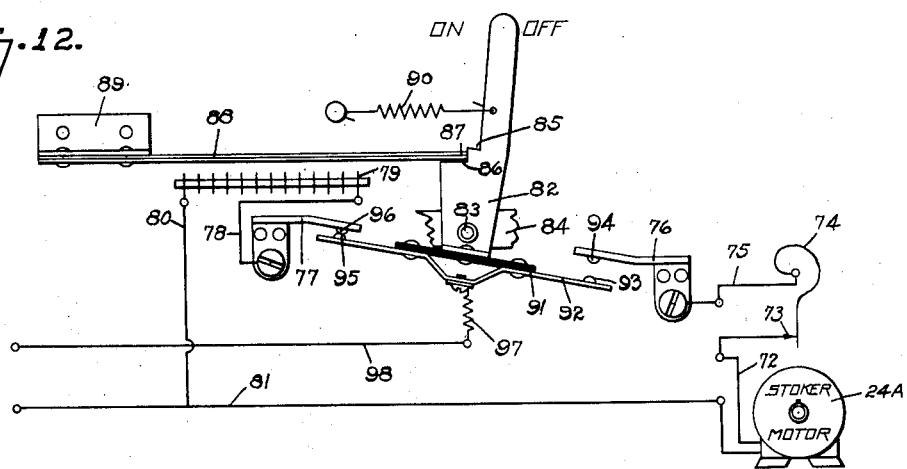
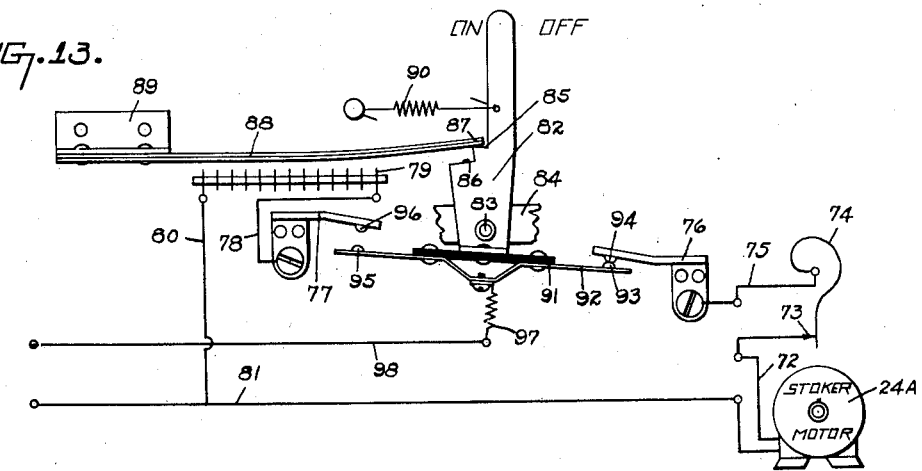
INVENTOR
L. R. TEEPLE.
BY
ATTORNEY Patented Mar. 14, 1944

2,344,183

UNITED STATES PATENT OFFICE 2,344,183

BURNER CONTROL FOR TENDING FIRE

Lawrence R. Teeple, Portland, Oreg.

Application February 8, 1941, Serial No. 378,093

3 Claims. (Cl. 236—46)

This invention relates generally to stoker controls and particularly to a clean fire switch.

The main object of this invention is to devise a method for automatically controlling a stoker during the period immediately following any manual shut-down of the stoker for fire tending purposes.

The second object is to construct an apparatus whereby a stoker is provided with a manual cut-out switch for fire tending purposes, and wherein there is provided an automatic means for closing the manually operated switch after a given lapse of time following the manual opening of said switch.

The third object is to provide a method of insuring the automatic resumption of service after a delay period following manual shut-down of a stoker for the purpose of tending the fire.

The fourth object is to provide a stoker timer adapted automatically to return the stoker to normal operation following a shut-down period initiated manually for the purpose of removing clinkers or otherwise tending to the stoker.

The fifth object is to provide a shut-down switch in the normal control circuit for a stoker and an actuator for the switch which, when manually moved to "off" position, will automatically return to "on" position following a predetermined delay period.

The sixth object is to provide a manually initiated automatically terminated shut-down period for tending a stoker employing timing mechanism commonly associated with normal control of such a stoker.

These and other objects are accomplished in the manner set forth in the following specification as illustrated in the accompanying drawings, in which Fig. 1 is a side elevation of a complete operating control unit.

Fig. 2 is a plan of Fig. 1.

Fig. 3 is a diagrammatic view of the control circuit showing the manner in which the device is connected.

Fig. 4 is a side elevation of one gear from the time train of the operating control having the operating mechanism connected to the gear. This view is taken along the line 4—4 in Fig. 2.

Fig. 5 is a front elevation of Fig. 4, showing the pawl in an inoperative position.

Fig. 6 is a view similar to Fig. 5, but showing the pawl in an operative position.

Fig. 12 is a diagrammatic view of a modified form of the device embodying a thermally actuated means for operating the clean fire switch which is shown in an open circuit position, in which the stoker motor cannot be operated.

Fig. 13 is a view similar to Fig. 12, but showing the parts in a closed circuit position in which the stoker motor can be operated.

Similar numerals refer to similar parts throughout the several views.

Figure 7:
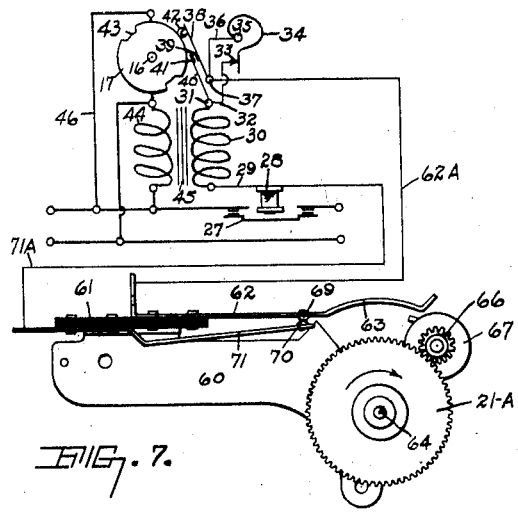
Fig. 7 is a diagrammatic view of an alternative form of the device showing the clean fire switch closed.
Figure 8:
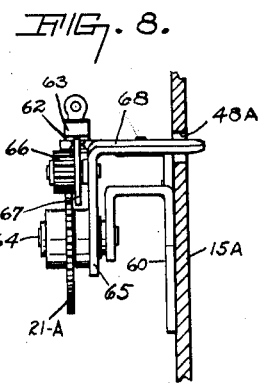
Fig. 8 is a partial end elevation of Fig. 7.
Figure 9:
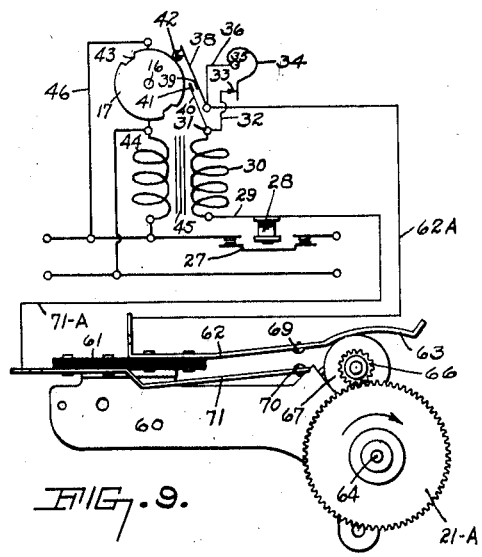
Fig. 9 is a view similar to Fig. 7, but showing the clean fire switch open.
Figure 10:
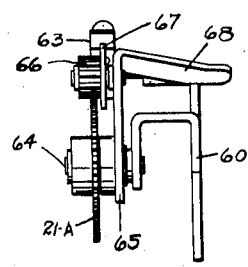
Fig. 10 is a partial end elevation of Fig. 9.
Figure 11:
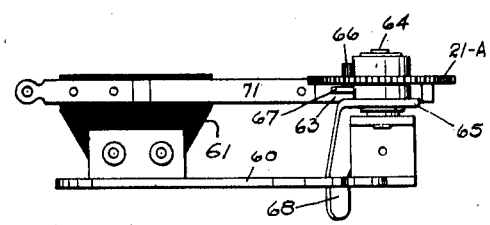
Fig. 11 is a bottom view of Fig. 9.
Figure 14:
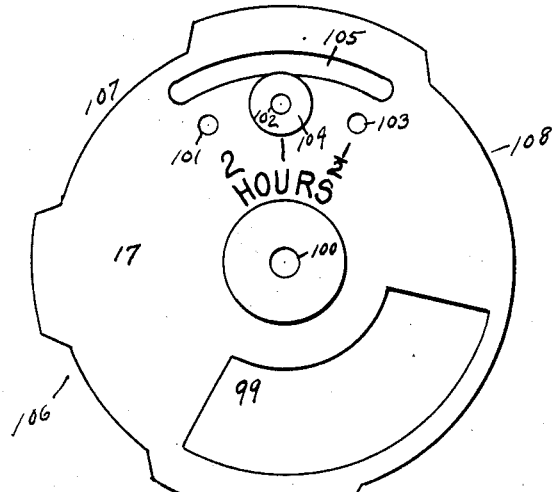
Fig. 14 is a front elevation of the first element in the operating cam.

Referring in detail to the drawings there are shown in Figs. 1 and 2 assembled views of the complete unit for which the front plate 15 forms a base. Through the plate 15 or 15—A extends the shaft 16 which revolves continuously at the rate of one half revolution per hour on whose outer end is mounted the adjustable cam 17, the function of which is to operate the motor controlling switch 18 at predetermined intervals of time. For example, if it is desired to operate the stoker one seven minute period during each hour, in the event there are no calls for heat from other sources, the indicators 19 and 20 are set as shown in Fig. 1; then as the cam 17 revolves on its shaft 16, the stoker motor will be operated for seven minutes out of an hour and shut down for 53 minutes as a minimum of operation. The hold fire cam 17 consists of a plurality of suitably notched concentric laminations adjustably disposed about a common hub, and held in position by a screw which passes through registering holes in the one-half hour, hour, or two hour positions. This arrangement merely serves to provide an adjustment for the length of the cam lobes.

The hold-fire cam 17 is provided with an arcuate window 99 through which the settings for the length of the period of operation can be made. The cam 17 has a central opening 100, which receives the shaft 16. It also has the three holes 101, 102 and 103, through which may pass the screw 104. The cam 17 also has an arcuate slot 105. In the periphery of the cam 17 are the three depressions 106, 107 and 108 of various lengths.

Figure 15:
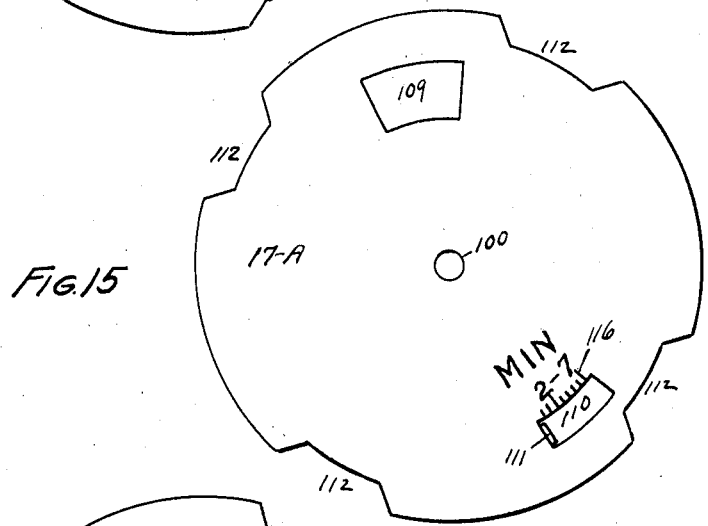
Fig. 15 is a front elevation of the second element in the operating cam.
Figure 16:
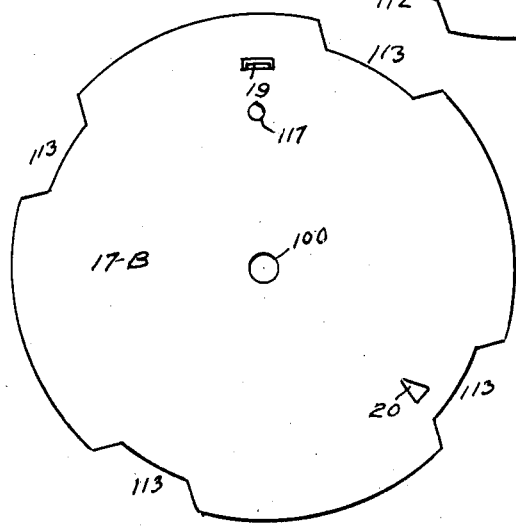
Fig. 16 is a front elevation of the third section of the operating cam.

In Fig. 15 is shown the second lamination 17A which contains an arcuate slot 109 which registers with the slot 105 but is somewhat shorter. The member 17A is also provided with a second arcuate slot 110 from one side of which projects an ear 111, which facilitates the movement of the member 17A. Four equidistant notches 112 of uniform length are formed around the perimeter of the member 17A.

The third disc 17B is provided with four arcuate notches 113, which are also of uniform length and size, as are the notches 112. The plate 17B is provided with an inturned ear 19, which extends forwardly through the slots 105 and 109. The plate 17B also has an indicator point 20 which occupies space with the slot 110 and can register with the calibrations 116 on the disc 17A. The purpose of this construction is as follows:

The relative position of the members 17 and 17A determine the number of depressions 112 which will be exposed, that is, if the screw 104 is in the hole 101, then only one depression is exposed. If the screw 104 is in the hole 102, then two depressions are exposed, meaning of course, that the stoker will be operated once every hour, while if the screw 104 is in the hole 103, four depressions will be exposed, causing the stoker to operate every half hour. Now it will be noted that the screw 104 passes through the arcuate slot 109 so that the plates 17A and 17B can be adjusted with relation to each other. That is, they can be moved so that the notches 112 and 113 are not in exact register or they can vary the length of the stoker operation, the amount of which is indicated by the pointer 20 on the scale 116.

It will be noted that the screw 104 while passing through the opening 109 extends into the hole 117 in the cam member 17B so that the plate 17A can be clamped between the members 17 and 17B. It follows then that by means of the three discs 17, 17A and 17B, there is provided a single cam by means of which the motor may be operated a different number of times in a given period, and the length of the operation can be varied.

Motion is supplied to the shaft 16 through its gear 21 by the motor 22 which operates the train of gears 23 of which the gear 21 is an intermediate.

A stoker motor 24 is indicated as being connected to the power leads 25 and 26. The lead 26 includes the electrically operated switch 27 which is operated by means of a solenoid 28, whose lead 29 is connected to one side of the transformer secondary 30, whose terminal 31 has connected thereto a lead 32 which is connected to the contact point 33 of the thermostat 34 whose terminal 35 is connected by the lead 36 to the post 37 on which is mounted the arm 38 on which is disposed the contact point 39 of the switch 18. The arm 40 is connected to the terminal 31 and carries on its outer end the contact point 41 which is adapted to register with the contact point 39 when the roller 42 of the arm 38 falls into a depression 43 of the cam 17.

The primary 44 of the transformer 45 and the timing motor 22 which drives the cam disc 17, are each connected across the power leads 25 and 26.

Referring particularly to my invention as illustrated in Figs. 1–6 inclusive, it will be noted that the gear 21 has pivotally mounted thereon a lever 47 of insulating material whose uppermost end 48 is adapted to ride against one side of the clean-fire switch arm 49 which is connected by a lead 50 to one side of the solenoid 28. The switch blade 51 is connected to the post 37 and it is across the points 52 of the members 49 and 51 that current flows to the solenoid 28 of the stoker motor switch 27.

Pivotally mounted on the lever 47 by means of a rivet 53 is the lever 54, whose pawl 55 is adapted to engage the teeth of the gear 21 and drive the lever 47 in a clockwise direction as shown in position shown in Fig. 6. The lever 54 also has a laterally turned lug 56 which is engaged by the projection 57 of the lever 47 and serves as a backward stop for the pawl 55 and limits the relative angularity of the members 48 and 54. The lever 54 also has an upturned lower portion 54—B which functions as a counterweight for the engagement of the pawl 55.

The operation of this form of the device is as follows:

Assuming that the stoker motor 24 is being operated under the control of the thermostatic element 34 and that the contact points of the switch 52 are closed by reason of the fact that the end 54—A of the switch lever 54 is at zero position, that is, opposite to the one shown in Fig. 1; and that the operator desires to tend the stoker for the purpose of removing the ashes or performing some operation during which time he does not wish the stoker to be operated for any reason; instead of opening the manual motor switch 58, which he might forget to re-close when his task is completed, he merely moves the end 54—A of the clean-fire switch lever 54 to the position shown in Fig. 1 in which it registers with the character 59, which in this case represents 15 minutes of shut-down. This action causes the end 48 of the insulated lever 47 to separate the contact points 52 and stop the flow of current to the solenoid 28.

Since the gear 21 is driven by the motor 22, which is still operating, it follows that when the predetermined time has elapsed, the gear 21 through the pawl 55 will move the lever end 48 away from the arm 49 permitting the contact points 52 to reengage. The gear 21 then moves the pawl 55 out of mesh as the lever end 54—A is restrained by the end of the slot. Obviously, the length of the stoker shut-down is determined by the setting of the lever 54—A.

In the form of the device shown in Figs. 7–11 inclusive, the operation is identical with that shown in Figs. 1–6, the difference being only in the means employed to accomplish the results. In this form of the device the stationary bracket 60 is mounted on the plate 15—A and has secured thereto a piece of insulating material 61 to which is secured a movable switch blade 62 which is connected by means of a lead wire 62—A to the post 37. The switch blade 62 has an arcuate portion 63 formed thereon whose center is along the axis of the pivot 64 of the gear 21—A which corresponds with the gear 21 in the first descriptive form of the device and is driven in a like manner from the train of gears 23. Mounted on the pivot 64 is a lever 65 on which is rotatably mounted the pinion 66 which meshes with and is driven by the gear 21—A. Secured to the pinion 66 is a fiber disc 67 which is in alignment with the arcuate portion 63 of the blade 62.

The end 68 of the lever 65 projects through the slot 48—A in the plate 15—A and when it is in zero or "on" position leaves the parts as shown in Fig. 7; that is, with the disc 67 out of engagement with the blade 62 and benig idly driven around by the gear 21—A. If then, the lever end 68 is moved to the fifteen minute position, the parts will take the position shown in Fig. 9, in which the disc 67 rides under the arcuate portion 63 of the blade 62 and separates the contact point 69 from the contact point 70 of the blade 71 which is mounted on the insulator 61 and is connected by means of the lead 71—A to one side of the solenoid 28.

It can be seen that any subsequent driving action of the gear 21—A will rotate the disc and drive it away from its switch opening position in precisely the same manner as described in Figs. 1-6.

In the form of the device shown in Figs. 12 and 13, the same operation is performed by means of a thermal timer; that is, the clean-fire switch is opened manually and closed automatically after a predetermined lapse of time.

In this form of the device, the stoker motor 24—A has one lead 72 connected to the contact 73 of the thermostat 74 whose lead 75 is connected to the stationary switch blade 76 which is spaced from the stationary switch blade 77. The blade 77 is connected by means of the lead 78 to a resistance element 79 which is connected by a lead 80 to one side 81 of the power line which is connected to the motor 24—A. Disposed between the blades 76 and 77 is a rockable lever 82 which is mounted on a pivot 83 on a fixed support 84. The lever 82 has a pair of notches 85 and 86 formed therein adapted to engage the end 87 of a bimetallic element 88 which is responsive to heat generated by the resistance element 79 and is mounted on the fixed bracket 89. The lever 82 is urged in one direction by the spring 90.

To the lever 82 is secured a strip of insulating material 91 to which is attached the elongated switch blade 92 whose contact 93 is adapted to engage the contact 94 of the blade 76 during the normal operation of the stoker or to have its contact 95 engage the contact 96 of the blade 77 during a clean-fire period. The blade 92 is connected by the flexible lead 97 to the side 98 of the power circuit.

The operation of this form of the device is quite similar to the two forms previously described and is stated as follows:

Assuming that the stoker is being operated in response to the thermostat 74, that is, to satisfy some specific heating requirement, and it is desired to tend the stoker for some purpose during which time it is very desirable that the stoker be not operated, all that is necessary is to move the lever 82 to the position shown in Fig. 12, which will cause the bimetallic element 88 to engage the notch 86 due to the spring tension in the member 88, causing an interruption in the flow of current to the stoker motor 24—A, and at the same time causing current to flow to the heater or resistance element 79 until it eventually warms the element 88 sufficiently to cause it to bend to the form shown in Fig. 13, that is, releasing the lever 82 and restoring the equipment to a condition which will operate the motor 24—A.

For the purpose of simplifying the illustration and description, I have omitted the intermittent operating mechanism, although it can be seen that the form of the device shown in Figs. 12 and 13 would function satisfactorily in conjunction with a time interval contactor.

While I have thus illustrated and described my invention, it is not my intention to be limited to the precise embodiment shown therein, but intend, rather, to cover such forms and modifications thereof as fall fairly within the appended claims.

I claim:

1. A fire tending switch disposed in the motor control circuit of a stoker consisting of a pair of switch blades normally closed by spring action, one of said blades having an arcuate extension formed thereon, a continuously rotating time driven gear associated with said switch, a planetary pinion meshing with said gear and having a disc mounted thereon, said disc passing under said arcuate extension in a manner to move same and thereby open said switch, and whereby said disc may be manually moved to said switch opening position and driven by said gear to a switch closing position.

2. A spring closed fire tending switch interposed in a motor control circuit of a stoker consisting of a continuously rotating time driven gear, a planetary pinion meshing with said gear, a disc drivably connected to said pinion, a switch blade in the path of said disc and adapted to be opened thereby, whereby said pinion may be manually moved toward said blade and whereby the driving action of said pinion will cause said disc to roll away from said blade and permit said switch to close under the action of said gear.

3. A switch actuator consisting of a movable switch blade, a continuously rotating gear associated therewith, a plantary pinion meshing with said gear, a disc driven by said pinion and disposed in the path of said blade, said disc being free to be swung manually against said blade and frictionally engage same in a manner to open said switch, and to be driven by said gear to roll away from said blade, and to close said switch after a predetermined lapse of time.

LAWRENCE R. TEEPLE.